Figure 1:
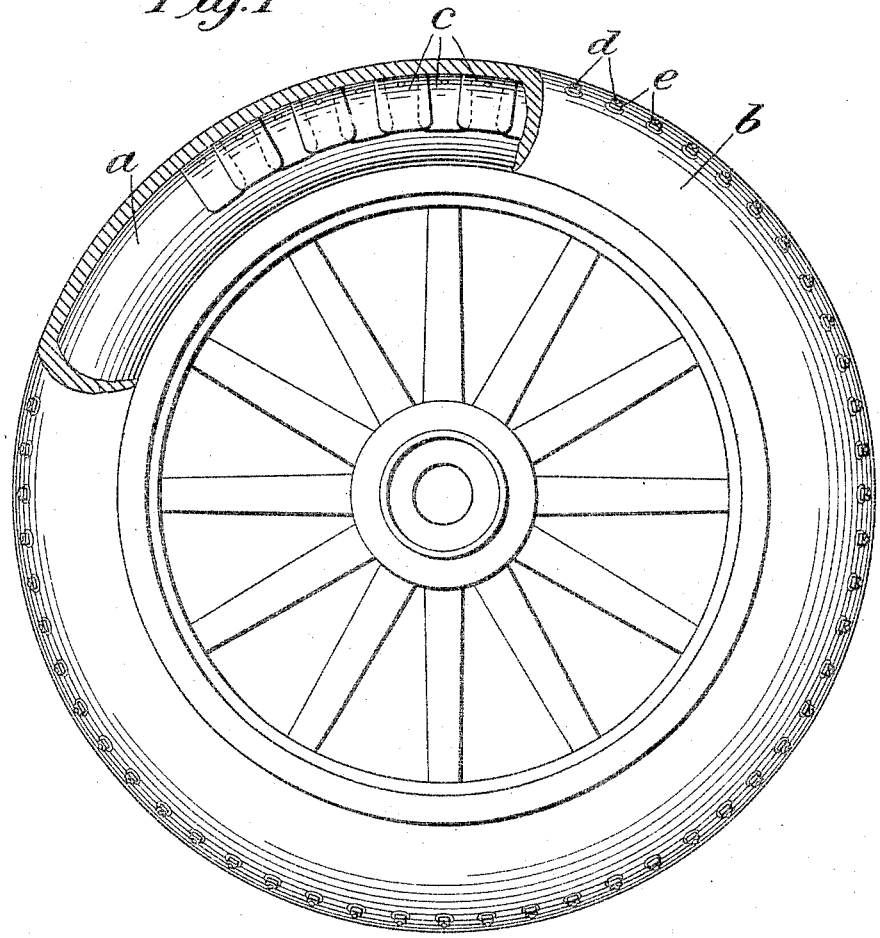

No. 776,035. PATENTED NOV. 29, 1904.
W. C. STOKES.
TIRE.
APPLICATION FILED AUG. 27, 1904.
NO MODEL.

Witnesses:
Chas. D. King
Susan E. Varney

Inventor:
Walter C. Stokes
by Redding, Kiddle & Greeley
Attys.

No. 776,035.

Patented November 29, 1904.

UNITED STATES PATENT OFFICE.

WALTER C. STOKES, OF NEW YORK, N. Y.

TIRE.

SPECIFICATION forming part of Letters Patent No. 776,035, dated November 29, 1904.

Application filed August 27, 1904. Serial No. 222,385. (No model.)

*To all whom it may concern:*

Be it known that I, WALTER C. STOKES, a citizen of the United States, residing in the borough of Manhattan, of the city of New York, in the State of New York, have invented certain new and useful Improvements in Tires, of which the following is a specification, reference being had to the accompanying drawings, forming a part hereof.

The object of this invention is to provide an improved tire, particularly for use upon automobiles and the like, which shall be puncture-proof and adapted to prevent skidding.

At the present time automobiles are generally provided either with pneumatic or solid-rubber tires. Where pneumatic tires are used, the constant puncturing of the same is a great source of annoyance and inconvenience, while the puncturing, cutting, and chipping of solid-rubber tires soon unfits them for use and they thereby become an item of considerable expense. Many efforts have been made to overcome these difficulties in tires without destroying at the same time their resilient effects, and among other devices to this end it has been proposed to employ a protective covering of steel plates to shield the tire proper from the destructive effects referred to.

In accordance with the present invention a protective cover is provided for the tire proper and comprises an outside shoe or tread the edges of which are to be secured to the tire proper, preferably by vulcanizing, and the inside of which is provided with some means to prevent the puncturing of the tire proper—as, for instance, suitably-formed steel plates—and said means are secured to the cover by fastening devices which extend through the cover and form projections thereupon to prevent skidding.

A convenient and practical embodiment of the invention is illustrated in the drawings, in which—

Figure 2:
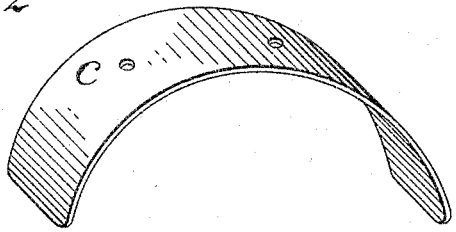

Figure 1 is a view in elevation of a wheel having the improvements applied thereto, a portion of the tire being broken away to show the structure thereof more clearly; and Fig. 2 is a perspective view of one of the protective steel plates.

The inner resilient portion or tire proper, $a$, together with the improved cover, will constitute, of course, the whole tire when the cover is in place and the vehicle is in use. Accordingly, where the word "tire" is used hereinafter it will be understood to refer to the tire proper and the cover.

The shoe or tread $b$, forming the outer protective portion of the tire, is preferably constructed of an elastic material, such as rubber, and has secured upon its inner side, so as to entirely cover the same, a plurality of convexo-concave steel plates $c$ or some other suitable device for preventing the tire proper from being punctured. Where the plates $c$ are employed, as in the present case, they are preferably arranged so that the alternate plates are separated by a space almost equal to the width of the plates themselves, one set of alternate plates covering the spaces left by the other set. Furthermore, each of the alternate plates of one set are placed upon its adjacent plates in the other set instead of having one edge above one adjacent plate and the other edge under the other adjacent plate, as it obviously might be arranged, because by the former arrangement the slight slipping of the plates upon each other as the wheel rotates is attended with less friction and wear upon the shoe and the tire proper.

When the cover is in place upon the tire proper, the plates $c$, as will be understood, rest between the shoe and the tire proper. The plates are secured, however, to the shoe or tread $b$ by suitable fastening devices which extend outwardly through the shoe, so as to form projections upon the periphery thereof, as already stated. Such a fastening device preferably consists of bolts $d$, which have nuts $e$, hexagonal or otherwise formed, threaded upon their outer ends, two bolts being generally sufficient for holding each plate in place, and said bolts being arranged upon each side of the center of the cover. In this way the fastening devices will be effective in reducing the possibilities of skidding.

As the cover is constructed it is preferably endless or continuous and is preferably applied to the tire proper by stretching it upon the same. The dimensions of the cover are such that its edges overlap the plates $c$, which are made sufficiently long, at least, to fully protect the tread portion of the tire proper and of course may be made long enough, if desired, to cover substantially the exposed surface of the tire proper. The overlapping edges of the cover, when it is in place, are preferably secured to the tire proper by vulcanizing, although some other suitable means for securing the cover to the tire may be found equally effective.

The improvements may be used upon all wheels where a protective cover is desired and upon all wheels where a non-skidding effect is the desideratum, as well as upon all wheels where both of these objects are sought. The use of the invention accordingly is not limited to automobiles nor to particular kind of tires. Neither is the invention limited to the precise structure shown and described herein; but departures may be made therefrom without avoiding the spirit of the invention.

I claim as my invention—

1. In a tire having an inner resilient portion and an outer tread portion, the combination of means between said portions to prevent the puncturing of the inner resilient portion and bolts extending through said means and the outer tread portion upon each side of the center of the outer tread portion, and nuts upon the outer ends of the bolts, for the purpose set forth.

2. In a tire having an inner resilient portion and an outer tread portion, the combination of a plurality of convexo-concave steel plates between said portions to prevent the puncturing of the inner resilient portion, bolts extending through the plates and the outer tread portion upon each side of the center of the outer tread portion, and nuts upon the outer ends of the bolts, for the purpose set forth.

3. A tire-cover, comprising an endless elastic tread, convexo-concave steel plates secured inside the elastic tread, the alternate plates of which overlap the edges of their adjacent plates, bolts extending through the plates and elastic tread upon each side of the center of the elastic tread, and nuts upon the outer ends of the bolts, substantially as described.

4. The combination with a wheel having a rubber tire proper, of a tire-cover comprising an endless elastic tread, convexo-concave steel plates secured inside the elastic tread, the alternate plates of which overlap the edges of their adjacent plates, bolts extending through the plates and tread upon each side of the center of the tread, and nuts upon the outer ends of the bolts, the edges of the tread overlapping said plates and being secured to the tire proper by vulcanizing, substantially as described.

This specification signed and witnessed this 25th day of August, A. D. 1904.

WALTER C. STOKES.

In presence of—
　WALTER N. STANLEY,
　LUCIUS E. VARNEY.